United States Patent
Zheng et al.

(10) Patent No.: US 11,423,203 B2
(45) Date of Patent: Aug. 23, 2022

(54) SYSTEM AND METHOD FOR MODELING THERMAL CIRCUITS

(71) Applicant: DELPHI TECHNOLOGIES IP LIMITED, St. Michael (BB)

(72) Inventors: Lijun Zheng, Kokomo, IN (US);
Ronald J. Krefta, Noblesville, IN (US)

(73) Assignee: DELPHI TECHNOLOGIES IP LIMITED, St. Michael (BB)

( * ) Notice: Subject to any disclaimer, the term of this patent is extended or adjusted under 35 U.S.C. 154(b) by 549 days.

(21) Appl. No.: 16/519,393

(22) Filed: Jul. 23, 2019

(65) Prior Publication Data

US 2021/0026929 A1    Jan. 28, 2021

(51) Int. Cl.

| | |
|---|---|
| *G06F 30/367* | (2020.01) |
| *G01K 13/00* | (2021.01) |
| *H01L 23/473* | (2006.01) |
| *G06F 119/08* | (2020.01) |
| *H02P 27/06* | (2006.01) |

(52) U.S. Cl.
CPC .......... *G06F 30/367* (2020.01); *G01K 13/00* (2013.01); *H01L 23/473* (2013.01); *G06F 2119/08* (2020.01); *H02P 27/06* (2013.01)

(58) Field of Classification Search
CPC ... G06F 30/367; G06F 2119/08; G01K 13/00; H01L 23/473; H02P 27/06; H02P 29/68
See application file for complete search history.

(56) References Cited

U.S. PATENT DOCUMENTS

| | | | |
|---|---|---|---|
| 3,622,849 A | 11/1971 | Kelley, Jr. et al. | |
| 4,001,649 A | 1/1977 | Young | |
| 5,712,802 A * | 1/1998 | Kumar | H05K 7/20918 702/45 |
| 6,203,191 B1 | 3/2001 | Mongan | |

(Continued)

FOREIGN PATENT DOCUMENTS

| | | |
|---|---|---|
| CN | 105929316 A | 9/2016 |
| DE | 10250731 A1 | 5/2004 |

(Continued)

OTHER PUBLICATIONS

Warwel et al. Real-Time Thermal Monitoring of Power Semiconductors in Power Electronics Using Linear Parameter-Varying Models for Variable Coolant Flow Situations Workshop on control and Modeling for Power Electronics, IEEE 2014 (Year: 2014).*

(Continued)

*Primary Examiner* — Rehana Perveen
*Assistant Examiner* — Cuong V Luu
(74) *Attorney, Agent, or Firm* — Joshua M. Haines; Bookoff McAndrews, PLLC

(57) ABSTRACT

A method for modeling a thermal circuit of power inverter includes setting a first input node of the thermal circuit to a first measured temperature. The method also includes setting a second input node of the thermal circuit to a second measured temperature. The method also includes determining at least one thermal characteristic of the thermal circuit using, at least, the first measured temperature. The method also includes determining an operating temperature of the thermal circuit based on the at least one thermal characteristic.

17 Claims, 4 Drawing Sheets

(56) References Cited

U.S. PATENT DOCUMENTS

| | | | |
|---|---|---|---|
| 6,595,005 B1 * | 7/2003 | Immel | G01K 7/42 |
| | | | 374/E7.042 |
| 2005/0273309 A1 | 12/2005 | Yoneyama et al. | |
| 2010/0050676 A1 * | 3/2010 | Takamatsu | B60K 11/02 |
| | | | 62/259.2 |
| 2017/0030778 A1 | 2/2017 | Zeng et al. | |

FOREIGN PATENT DOCUMENTS

| | | | | |
|---|---|---|---|---|
| DE | 102016118293 A1 * | 3/2018 | | G01K 3/10 |
| WO | 9739397 A1 | 10/1997 | | |
| WO | 2015132217 A1 | 9/2015 | | |
| WO | WO-2020013457 A1 * | 1/2020 | | B60L 3/003 |

OTHER PUBLICATIONS

Prasanth et al. Condition Monitoring of Electrolytic Capacitor Based on ESR Estimation and Thermal Impedance Model Using Improved Power Loss Conputation 2018 International Power Electronics Conference (Year: 2018).*

Manuel Warwel et al., Real-Time Coolant Temperature Monitoring in Power Electronics Using Linear Parameter-Varying Models for Variable Coolant Flow Situations, Therminic 2014 20th International Workshop on Thermal Investigations of ICs and Systems, Sep. 2014, Greenwich, London, UK.

Manuel Warwel et al., Real-Time Thermal Monitoring of Power Semiconductors in Power Electronics using Linear Parameter-Varying Models for Variable Coolant Flow Situations, 2014 IEEE 15th Workshop on Control and Modeling for Power Electronics (COMPEL), Jun. 22-25, 2014, Santander, Spain.

* cited by examiner

SYSTEM AND METHOD FOR MODELING THERMAL CIRCUITS

TECHNICAL FIELD

This disclosure relates to thermal circuits, and in particular, to systems and methods for modeling thermal circuit characteristics.

BACKGROUND

Power electronics, such as power inverters, typically include solid-state electronics that are used in a variety of applications to control power characteristics in applications. For example, a power inverter associated with a vehicle may be used to drive an electric propulsion system of the vehicle by generating alternating current power using direct current power.

Typically, operating temperatures (e.g., voltages) of a power inverter are modeled to reduce the risk of overheating a semiconductor associated with the power inverter in operation. In order to model the operating temperature of the power inverter, various thermal characteristics, such as temperature (e.g., voltage values) and/or power loss (e.g., current) values at one or more nodes of a thermal circuit associated with the power inverter, are calculated for various operating scenarios during bench testing of the power inverter and/or in real-time operation of the power inverter (e.g., production use of the power inverter). The calculated thermal characteristics may then be used to estimate the operating temperatures of the power inverter during the various operating scenarios. The thermal characteristics and/or other characteristics of the thermal circuit of the power inverter may be adjusted, such that the estimated operating temperatures of the power inverter during the various operating scenarios are within an operating temperature threshold (e.g., to avoid overheating the semiconductor associated with the power inverter). However, typical systems that model the operating temperatures of the power inverter may introduce an error estimator scaled by Luenberger factors, which may affect the accuracy of the estimated operating temperatures.

SUMMARY

This disclosure relates generally to thermal circuit modeling systems and methods.

An aspect of the disclosed embodiments is a method for modeling a thermal circuit of a power inverter. The method includes setting a first input node of the thermal circuit to a first measured temperature. The method also includes setting a second input node of the thermal circuit to a second measured temperature. The method also includes determining at least one thermal characteristic of the thermal circuit using, at least, the first measured temperature and the second measured temperature. The method also includes determining an operating temperature of the thermal circuit based on the at least one thermal characteristic.

Another aspect of the disclosed embodiments is thermal circuit modeling system. The system includes a thermal circuit and a controller. The thermal circuit is associated with a power inverter having one or more input power (current) sources. The controller is configured to: set the first input node of the thermal circuit to a first measured temperature; set the second input node of the thermal circuit to a second measured temperature; determine at least one thermal characteristic of the thermal circuit using, at least, the first measured temperature and the second measured temperature; and determine an operating temperature of the thermal circuit based on the at least one thermal characteristic.

Another aspect of the disclosed embodiments is a method for determining a coolant flow rate of a modeled thermal circuit of a power inverter. The method includes setting a first input node of a thermal circuit associated with the power inverter to a first measured temperature. The method also includes setting a second input node of the thermal circuit to a second measured temperature. The method also includes determining at least one thermal characteristic of the thermal circuit using, at least, the first measured temperature and the second measured temperature. The method also includes determining the coolant flow rate of the power inverter based on the at least one thermal characteristic. The method also includes determining a first power loss value at the first input node. The method also includes selectively adjusting the coolant flow rate of the modeled thermal circuit based on the first power loss value.

These and other aspects of the present disclosure are provided in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
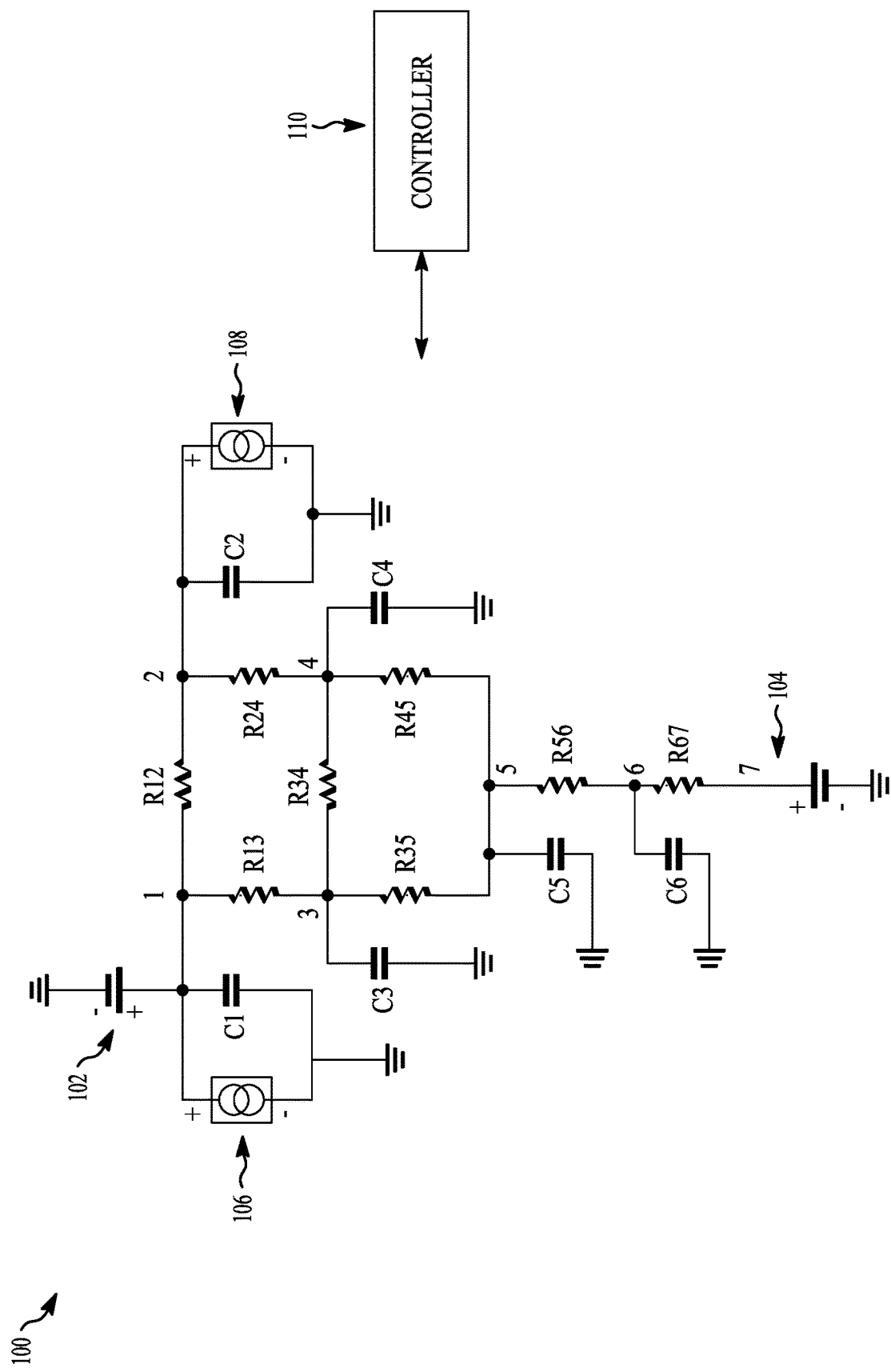
FIG. 1 generally illustrates a thermal circuit according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, power electronics, such as power inverters, typically include solid-state electronics that are be used in a variety of applications to control power characteristics in an application, convert power characteristics in an application, and so on. For example, a power inverter associated with a vehicle may be used to drive an electric propulsion motor of the vehicle.

Typically, the power inverter includes a cooling mechanism, such as a liquid cooled heatsink that transfers waste heat (e.g., generated while in operation) from the inverter to a coolant associated with the liquid cooled heatsink to a radiator. Operating temperatures of a power inverter are modeled to reduce the risk of overheating a semiconductor associated with the power inverter in operation. In order to model the operating temperatures (e.g., voltages) of the power inverter, thermal resistance and capacitance between nodes in the circuit are measured during bench testing of the power inverter. Power loss (e.g., current) is calculated from power loss mathematical equations of power device.

The calculated thermal characteristics may then be used to estimate the operating temperatures of the power inverter during various operating scenarios. The thermal characteristics and/or other characteristics of the thermal circuit of the power inverter may be adjusted, such that the estimated operating temperatures of the power inverter during the various operating scenarios are close to the temperature measured on the physical sensor. The purpose is to monitor temperature at all junctions including those without temperature sensors placed within so that the device is maintained within an operating temperature limit (e.g., to avoid overheating the semiconductor associated with the power inverter).

Typical systems (e.g., state observer systems, which may be referred to as thermal observer systems) that model the operating temperatures of the thermal circuit, monitor temperature sensor measurements associated with an insulated-gate bipolar transistor (IGBT) of the thermal circuit. For example, a typical real-time thermal management system used to estimate the operating temperatures of the thermal circuit (e.g., and/or the semiconductor associated therewith) may include analyzing a multi-variable model having linear parameter-varying scalar factors for various operating scenarios. Such a system may calculate a plurality of state space equations using temperature associated with a plurality of nodes of the thermal circuit during a particular operating scenario. The system may then estimate the operating temperature of the thermal circuit (e.g., during the particular operating scenario) using the results of the state space equations.

However, such systems typically treat input temperatures (e.g., an IGBT input temperature and a coolant input temperature, as will be described) as unknown values. Accordingly, such systems typically introduce an error estimator scaled by Luenberger factors, which may affect the accuracy of the estimated operating temperatures.

Because such systems treat the input temperatures as unknown values, the input temperatures are approximated for the state space equations similarly. As a result, typical systems integrate reference input temperatures into the state space equations by introducing Luenberger scaling factors. For example, a difference between an actual output from the thermal circuit and the calculated output of the thermal circuit may be multiplied by a Luenberger gain value for each state space equation. Additionally, or alternatively, the Luenberger gain value used for a particular operational scenario may be reiterated and used to test the thermal circuit during bench testing (e.g., prior to production use of the power inverter). The following equation illustrates a typical state space equating using such Luenberger factors:

$$\dot{\hat{x}} = A\hat{x} + Bu + L(y - \hat{y})$$

Where $\dot{\hat{x}}$ corresponds to the expected change of rate of the temperature at a specific moment of the thermal circuit, A corresponds to the inverse of the resistance (which may be referred to as thermal resistance) of the thermal circuit multiplied by the capacitance (which may be referred to as thermal mass) of the thermal circuit, $\hat{x}$ corresponds to the calculated temperature for the thermal circuit, B corresponds to the inverse of the capacitance of the thermal circuit, u corresponds to the thermal power through the thermal circuit, L corresponds to the Luenberger gain value, y corresponds to the actual output of the thermal circuit, and $\hat{y}$ corresponds to the calculated output of the thermal circuit.

Typically, because such systems treat input temperature as unknown values, a relatively large amount of error may be introduced into the state space equations and may result in unreliable calculations. Additionally, or alternatively, the Luenberger scaling factors used by such typical systems may only be testable during bench testing of the thermal circuit (e.g., or the power inverter), which may comprise a relatively complicated test, especially when using multiple sources of a reference system. Further, the Luenberger scaling factors may be reiterated each time there is a change made to the thermal circuit (e.g., the thermal circuit may be retested using the Luenberger scaling factors or updated Luenberger scaling factors). Additionally, or alternatively, such systems do not apply physical reasoning for the error observed and corrected using the Luenberger scaling factors. Instead, the Luenberger scaling factors merely provide a mathematical construct, which does not account for physical characteristics that may contribute to the observed error.

Accordingly, systems and methods, such as those described herein that reduce or eliminate error in state space equations used for modeling a thermal circuit, that account for physical characteristics of the thermal circuit, and that allow for real-time operational testing, may be desirable. In some embodiments, the systems and the methods described herein model input temperature sources, as will be described, which allows for integration of reference variables into the state space equations without introducing error (e.g., without using Luenberger scaling factors). In some embodiments, the systems and methods described herein may use input power loss values associated with the input temperature sources in order to model theoretical values of power loss that flows from the input temperature sources into the thermal circuit. This may provide a description of the accuracy of the model of the thermal circuit without interfering with the state space equations, as will be described.

With reference to FIG. 1, a thermal circuit 100, according to the principles of the present disclosure, is generally illustrated. The thermal circuit 100 may include any suitable thermal circuit and may be used in any suitable application. For example, as described, the thermal circuit 100 may be associated with a power inverter that drives an electric propulsion motor of a vehicle. While the thermal circuit 100 is described as being associated with a power inverter that drives an electric propulsion motor of a vehicle, it should be understood that the thermal circuit 100 may be used in any suitable power electronic or other electronic circuit. Accordingly, the embodiments of the systems and methods described herein may be used to model any suitable electronic circuit including the thermal circuit 100 or any other suitable electronic circuit.

The thermal circuit 100 includes a plurality of electronic components. For example, the thermal circuit 100 includes a plurality of resistors, such as resistors R12, R13, R24, R34, R35, R45, R56, and R67. Each of the plurality of resistors may include any suitable resistance value. Additionally, or alternatively, the thermal circuit 100 may include additional or fewer resistors than those described herein. The thermal circuit 100 includes a plurality of capacitors, such as capacitors C1, C2, C3, C4, C5, and C6. Each of the plurality of capacitors may include any suitable capacitance value.

Additionally, or alternatively, the thermal circuit 100 may include additional or fewer capacitors than those described herein. The thermal circuit 100 includes a plurality of power sources, such as power sources 106 and 108. Each of the plurality of power sources may include any suitable power loss value. Additionally, or alternatively, the thermal circuit 100 may include additional or fewer power sources than those described herein.

In some embodiments, the thermal circuit 100 includes a first input temperature source 102 (e.g., sometimes referred to as an IGBT input temperature source) and a second input temperature source 104 (e.g., sometimes referred to as a coolant input temperature source). The first input temperature source 102 may be connected to ground on one side of the first input temperature source 102 and connected to the capacitor C1, the resistor R12, the resistor R13, and a power source (e.g., power loss) associated with an insulated-gate bipolar transistor (IGBT) power loss 106 on another side of the first input temperature source 102. The second input temperature source 104 may be connected to ground on one side of the second input temperature source 104 and to the resistor R67 on another side of the second input temperature source 104.

In some embodiments, the thermal circuit 100 includes a plurality of nodes, such as a first node (node 1), a second node (node 2), a third node (node 3), a fourth node (node 4), a fifth node (node 5), a sixth node (node 6), and a seventh node (node 7). In some embodiments, the thermal circuit 100 includes additional or fewer nodes than those described herein. Node 1 may include a node of the thermal circuit 100 connecting the first input temperature source 102, the resistor R12, and the resistor R13. Node 2 may include a node of the thermal circuit 100 connecting the resistor R12, the resistor R24, the capacitor C2 and a power source 108 (e.g. power loss) associated with a diode's power loss. The power source 108 may be connected to the capacitor C2 on one side of the power source 108 and connected to ground on another side of the power source 108.

Node 3 may include a node of the thermal circuit 100 connecting the resistor R13, the resistor R34, the resistor R35, and the capacitor C3. In some embodiments, the capacitor C3 is connected to node 3 on one side of the capacitor C3 and connected to ground on another side of the capacitor C3. Node 4 may include a node of the thermal circuit 100 connecting the resistor R24, the resistor R34, the resistor R45, and the capacitor C4. In some embodiments, the capacitor C4 is connected to node 4 on one side of the capacitor C4 and connected to ground on another side of the capacitor C4. Node 5 may include a node of the thermal circuit 100 connecting the resistor R56, the resistor R45, the resistor R35, and the capacitor C5. In some embodiments, the capacitor C5 is connected to node 5 on one side of the capacitor C5 and connected to ground on another side of the capacitor C5. In some embodiments, the resistor R56 is connected to node 5 on one side of the resistor R56 and connected to node 6 on another side of the resistor R56.

Node 6 may include a node of the thermal circuit 100 connecting the resistor R56, the resistor R67, and the capacitor C6. In some embodiments, the capacitor C6 is connected to node 6 on one side of the capacitor C6 and connected to ground on another side of the capacitor C6. In some embodiments, the resistor R67 is connected to node 6 on one side of the resistor R67 and connected to node 7 on another side of the resistor R67. Node 7 may include a node of the thermal circuit 100 connecting resistor R67 and the second input temperature source 104.

As described, the thermal circuit 100 may be associated with a power inverter that drives an electric propulsion motor of a vehicle. The thermal circuit 100 may include a liquid cooled heatsink that uses coolant to transfer waste heat from the thermal circuit 100 to a radiator. It should be understood that the principles of the present disclosure may be applied to any suitable thermal circuit (e.g., other than the thermal circuit 100) and in any suitable application (e.g., other than described herein).

During operation of, for example, the inverter that drives electric propulsion motor of the vehicle, an operating temperature of the thermal circuit 100 may increase while the thermal circuit 100 drives the electric propulsion motor. The operating temperature of the thermal circuit 100 may vary in response to varying operating parameters of the thermal circuit under various operating scenarios. As demand for electric propulsion increases, the operating temperature may exceed a threshold value, which may damage the thermal circuit 100 or other components of the vehicle.

In order to reduce the risk of the thermal circuit 100 overheating, the thermal circuit 100 may be modeled to estimate thermal characteristics, such as, operating temperature (e.g., voltage) values using temperature sensors disposed on various junctions on the thermal circuit 100, operating power loss (e.g., current) values, coolant temperature, coolant flow rate, other suitable thermal characteristics, or a combination thereof. As will be described, a controller 110 may generate various signals and/or alarms based on the estimated thermal characteristics. For example, an estimated operating temperature being above an operating temperature threshold may indicate an emergent condition (e.g., a potential fault). Additionally, or alternatively, an estimated coolant flow rate being below a coolant flow rate threshold may indicate an emergent condition. The controller 110 may generate a signal and/or alarm, based on the estimated operating temperature and/or the estimated coolant flow rate, which indicates the emergent condition.

As described, the thermal circuit 100 is in communication with the controller 110. The controller 110 is configured to model the thermal circuit 100, as described. The controller 110 may include a processor and a memory. The memory may include instructions that, when executed by the processor, cause the controller 110 to perform various steps associated with modeling the thermal circuit 100. The controller 110 may be any suitable controller 110 and may be associated with a computing device, such as a mobile computing device, a tablet computing device, a desktop computing device, a laptop computing device, a stand-alone (e.g., dedicated) computing device, or other suitable computing device. The controller 110 may communicate with the thermal circuit 100 via a communications port, such as a peripheral port associated with the power inverter.

In some embodiments, one or more sensors may be in communication with various electronic components of the thermal circuit 100. The one or more sensors may measure various characteristics of the thermal circuit 100, such as temperature, power loss values, other suitable characteristics, or a combination thereof. In some embodiments, the controller 110 is configured to receive measurements from the one or more sensors. In some embodiments, a user may input various measurements and characteristics of the thermal circuit 100 (e.g., measured by the one or more sensors, measured by a measurement device, or measured in another suitable manner) into the computing device associated with the controller 110 (e.g., the controller 110 may be in indirect communication with the thermal circuit 100).

In some embodiments, the controller 110 is integrated with the power inverter associated with the thermal circuit 100 and the thermal circuit 100 may communicate with the controller 110 via a bus or other suitable communications device disposed on or proximate the power inverter.

In some embodiments, the controller 110 is configured to calculate state space equations in order to model the thermal circuit 100 (e.g., to estimate operating temperatures of the thermal circuit 100). As described, the state space equations, described herein, include a reference value for the first input temperature source 102 and the second input temperature source 104. For example, the controller 110 is configured to mode the thermal circuit 100 using the following equations:

$$\dot{\hat{x}} = A\hat{x} + Bu \quad (1)$$

$$\dot{\hat{V}}_2 = A_{21}V_1 + A_{22}\hat{V}_2 + A_{24}\hat{V}_4 + B_2 u_2 \quad (2)$$

$$\dot{\hat{V}}_3 = A_{31}V_1 + A_{33}\hat{V}_3 + A_{34}\hat{V}_4 + A_{35}\hat{V}_5 \quad (3)$$

$$\dot{\hat{V}}_4 = A_{42}\hat{V}_2 + A_{43}\hat{V}_3 + A_{44}\hat{V}_4 + A_{45}\hat{V}_5 \quad (4)$$

$$\dot{\hat{V}}_5 = A_{53}\hat{V}_3 + A_{54}\hat{V}_4 + A_{55}\hat{V}_5 + A_{56}\hat{V}_6 \quad (5)$$

$$\dot{\hat{V}}_6 = A_{65}\hat{V}_5 + A_{66}\hat{V}_6 + A_{67}V_7 \quad (6)$$

In equation (1), $\dot{\hat{x}}$ corresponds to the change of rate of the temperature at the nodes at a specific moment. At each moment, the change of rate of the respective node is updated with the previous moment's temperature value. The temperature for a specific moment is updated using the following equation:

$$V_{specific} = V_{previous} + (\text{time step}) * \dot{V} \quad (7)$$

A corresponds to the coefficient matrix of a combination of the inverse of the connected thermal resistance and capacitance of the corresponding node for every node of the thermal circuit 100, 2 corresponds to the calculated temperature for the thermal circuit, B corresponds to the inverse of the capacitance of the respective nodes, and u corresponds to the thermal power through the thermal circuit. In equation (2), $\dot{\hat{V}}_2$ corresponds to the change of rate of the temperature at node 2 at that specific moment, $A_{21}V_1$ corresponds to the product of the temperature at node 1 and the inverse of the resistance value multiplied by the capacitance value between node 1 and node 2, $A_{22}\hat{V}_2$ corresponds to the product of the calculated temperature at node 2 and the inverse of the resistance value multiplied by the capacitance value at node 2, $A_{24}\hat{V}_4$ corresponds to the product of the calculated temperature at node 4 and the inverse of the resistance value multiplied by the capacitance value C2, and $B_2 u_2$ corresponds to the product of inverse of the capacitance value from the power source 108 at node 2 and the power loss value at node 2.

In equation (3), $\dot{\hat{V}}_3$ corresponds to the change of rate of the temperature at node 3 at that specific moment, $A_{31}V_1$ corresponds to the product of the temperature at node 1 and the inverse of the resistance value multiplied by the capacitance value between node 1 and node 3, $A_{33}\hat{V}_3$ corresponds to the product of the calculated temperature at node 3 and the inverse of the resistance value multiplied by the capacitance value at node 3, $A_{34}\hat{V}_4$ corresponds to the product of the calculated temperature at node 4 and the inverse of the resistance value multiplied by the capacitance value C3, and $A_{35}\hat{V}_5$ corresponds to the product of the calculated temperature at node 5 and the inverse of the resistance value multiplied by the capacitance value C5.

In equation (4), $\dot{\hat{V}}_4$ corresponds to the change of rate of the temperature at node 4 at that specific moment, $A_{42}\hat{V}_2$ corresponds to the product of the calculated temperature at node 2 and the inverse of the resistance value multiplied by the capacitance value C2, $A_{43}\hat{V}_3$ corresponds to the product of the calculated temperature at node 3 and the inverse of the resistance value multiplied by the capacitance value between C3, $A_{44}\hat{V}_4$ corresponds to the product of the calculated temperature at node 4 and the inverse of the resistance value multiplied by the capacitance value at node 4, and $A_{45}\hat{V}_5$ corresponds to the product of the calculated temperature at node 5 and the inverse of the resistance value multiplied by the capacitance value C5.

In equation (5), $\dot{\hat{V}}_5$ corresponds to the change of rate of the temperature at node 5 at that specific moment, $A_{53}\hat{V}_3$ corresponds to the product of the calculated temperature at node 3 and the inverse of the resistance value multiplied by the capacitance value C3, $A_{54}\hat{V}_4$ corresponds to the product of the calculated temperature at node 4 and the inverse of the resistance value multiplied by the capacitance value between C4, $A_{55}\hat{V}_5$ corresponds to the product of the calculated temperature at node 5 and the inverse of the resistance value multiplied by the capacitance value at node 5, and $A_{56}\hat{V}_6$ corresponds to the product of the calculated temperature at node 6 and the inverse of the resistance value multiplied by the capacitance value C6.

In equation (6), $\dot{\hat{V}}_6$ corresponds to the change of rate of the temperature at node 6 at that specific moment, $A_{65}\hat{V}_5$ corresponds to the product of the calculated temperature at node 5 and the inverse of the resistance value multiplied by the capacitance value C5, $A_{66}\hat{V}_6$ corresponds to the product of the calculated temperature at node 6 and the inverse of the resistance value multiplied by the capacitance value at node 6, and $A_{67}V_7$ corresponds to the product of the temperature at node 7 (e.g., the second input temperature or the coolant input temperature) and the inverse of the resistance value multiplied by the capacitance value C6.

In some embodiments, the controller 110 may use calculated results of the state space equations (1)-(6) to estimate operating temperature (e.g., voltage) values of the thermal circuit 100 under various scenarios. As described, various components of the thermal circuit 100 may be adjusted in response to the estimated operating temperatures.

In some embodiments, the controller 110 is configured to determine theoretical values of thermal power that flows from the input temperature source 102. For example, the controller 110 may determine power loss values associated with the input temperature source 102 in order to determine the theoretical values of thermal power that flows from the input temperature source 102. The theoretical values of thermal power that flows from the input temperature source 102 may describe an accuracy of the estimated operating temperatures. For example, the controller 110 may be configured to determine power loss values associated with the input temperature source 102 using the following equations:

$$\frac{i_1}{C_1} = -(A_{11}\hat{V}_1 + A_{12}\hat{V}_2 + A_{13}\hat{V}_3 + B_1 u_1) \quad (8)$$

In equation (8), $$\frac{i_1}{C_1}$$

corresponds to the power loss value associated with the first input temperature source 102 divided by the capacitance C1, $A_{11} \hat{V}_1$ corresponds to the product of the calculated temperature at node 1 and the inverse of the resistance value multiplied by the capacitance value at node 1, $A_{12} \hat{V}_2$ corresponds to the product of the calculated temperature at node 2 and the inverse of the resistance value multiplied by the capacitance value between node 1 and node 2, $A_{13} \hat{V}_3$ corresponds to the product of the calculated temperature at node 3 and the inverse of the resistance value multiplied by the capacitance value C3, and $B_1 u_1$ corresponds to the product of inverse of the capacitance value at node 1 and the power loss value from the power source 106 at node 1.

In some embodiments, the controller 110 may use the calculated power loss values associated with the input temperature source 102 to predict and/or estimate a flow rate associated with the coolant of the liquid coolant heatsink of the thermal circuit 100. For example, using the equation (8), the controller 110 may set a temperature associated with the input temperature source 102 (e.g., $V_1$ in equation (8)) to a measured temperature. The measured temperature corresponds to an actual temperature measured (e.g., using a sensor or other suitable measuring mechanism) at an IGBT of an actual circuit. The measured temperature is used as the first temperature in order to model the thermal circuit 100 using the equations described herein. The calculated power loss value associated with the input temperature source 102 (e.g., $i_1$) may describe a difference between a temperature source 102 and a calculated temperature (e.g., voltage values calculated by the controller 110 using the equations (1)-(6)), which may describe the accuracy of the thermal power calculated flow rate. As a result, the sum of power loss values associated with the input temperature source 102 for all six connected devices, may be used by the controller 110 to calibrate the flow rate of the coolant of the liquid cooled heatsink.

Figure 2:
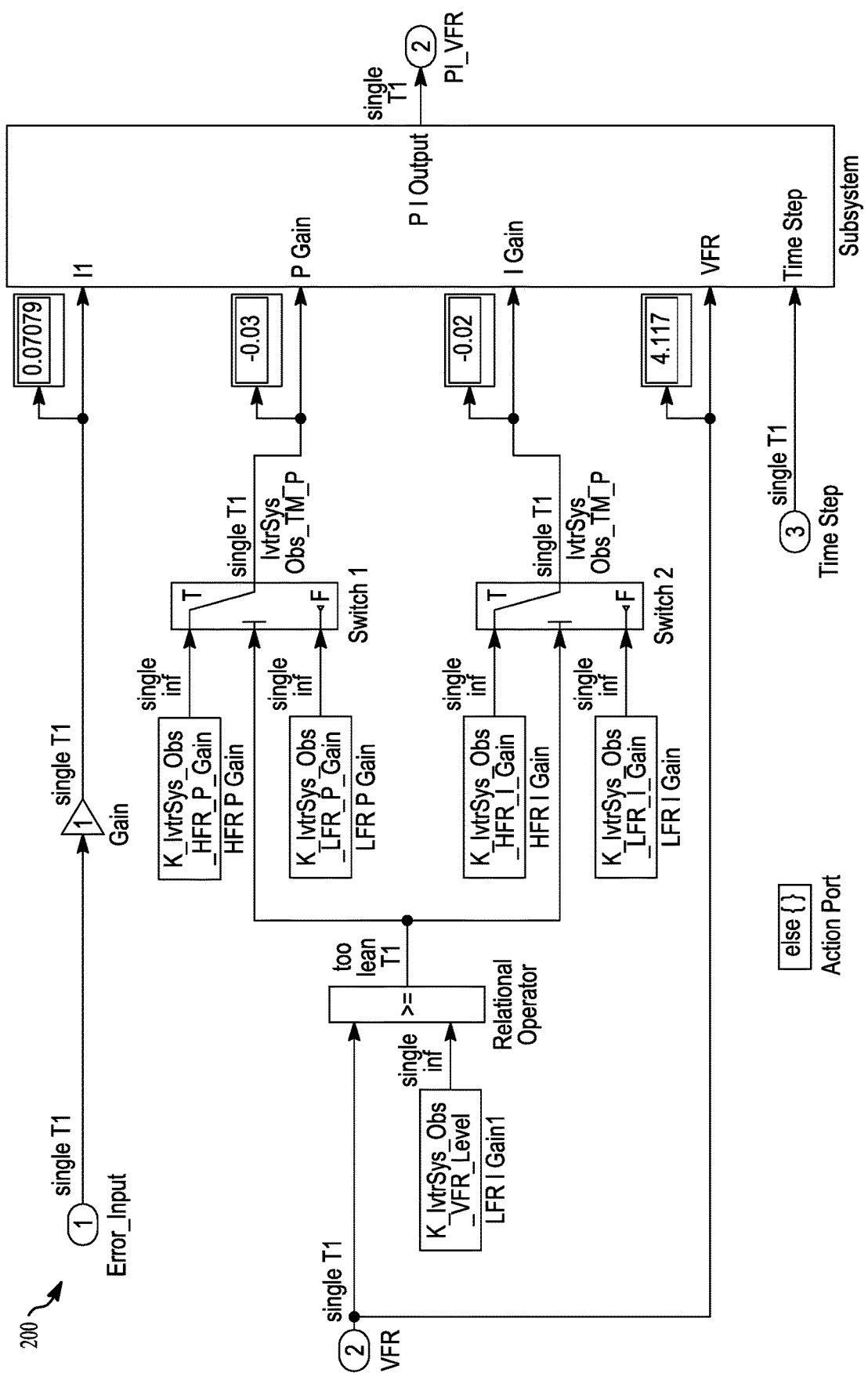
FIG. 2 generally illustrates a control loop for flow rate according to the principles of the present disclosure.

As is generally illustrated in FIG. 2, the controller 110 uses the sum of various power loss values associated with the first input temperature source 102 (e.g., calculated by the controller 110 under various operating scenarios) as an error input in a control loop 200 to modulate a change in flow rate. For example, as is generally illustrated in FIG. 1, a direction of thermal power flow is illustrated as coming out of the first input temperature source 102. The controller 110 calculates a sum of the various power loss values associated with the first input temperature source 102. A positive sum of the various power loss values associated with the first input temperature source 102 indicates that the temperature associated with the first input temperature source 102 is greater than a steady state temperature at node 1. Accordingly, the controller 110 may decrease the calculated flow rate of the control system, which will in turn increase the resistance value of R56 and R67, increasing the temperature value for each respective node, in order to draw the power loss between temperature source and nodal nodes to zero.

Conversely, a negative sum of the various power loss values associated with the first input temperature source 102 indicates that the temperature associated with the first input temperature source 102 is less than a steady state temperature at node 1. Accordingly, the controller 110 may increase the calculated flow rate of the control system, which will in turn decrease the resistance value of R56 and R67, decreasing the temperature value for each respective node, in order to draw the power loss between temperature source and nodes to zero.

In some embodiments, the controller 110 may predict the flow rate by controlling the sum of the various power loss values associated with the first input temperature source 102 (e.g., calculated by the controller 110 under various operating scenarios) for a plurality of thermal circuits. By controlling the sum of various power loss values from the first input temperature source 102 of all six devices, the thermal power flow rate of the coolant system can be predicted. The controller 110 may also make it possible to model distortion factor on power loss with individual power loss values on each device, which may provide an advantage over the Luenberger approached, described herein.

In some embodiments, the controller 110 may use different reference variables to model the thermal circuit 100 than those described. For example, thermal power inflow at node 2 from power source 108 is provided by a control board for node 2 temperature calculation. The controller 110 may use the temperature at the power source 108 as well as power source 106 and the measured temperature at the first temperature source 102 to calculate the state space equations (1)-(7) and/or equation (8). The controller 110 may calculate power loss from the first input temperature source 102 into the node 1 to provide accuracy of the calculated results of the equations (1)-(8).

Additionally, or alternatively, if a temperature associated with the first input temperature source 102 are not known, a temperature may be measured by a sensor disposed on the diode or other junctions of the power inverter. The controller 110 may model the thermal circuit 100 to include an additional temperature source corresponding to the location of the sensor.

While various examples are described herein, it is envisioned that the principles of the present disclosure may be utilized for various other examples and/or embodiments not described herein. For example, the principles of the present disclosure may be applied to thermal circuits having a different number of thermal nodes than those described herein and/or a different number of thermal sources (e.g., temperature sources) than those described herein. Accordingly, the controller 110 may use a different number of thermal measurements for accurate estimation of system node temperature (e.g. voltages). It should be understood that the systems described herein may monitor the temperature of fewer or more than six devices. Furthermore, the systems and methods described herein are applicable to systems other than thermal systems.

In some embodiments, the controller 110 may perform the methods described herein. However, the methods described herein as performed by the controller 110 are not meant to be limiting, and any type of software executed on a controller can perform the methods described herein without departing from the scope of this disclosure. For example, a controller, such as a processor executing software within a computing device, can perform the methods described herein.

Figure 3:
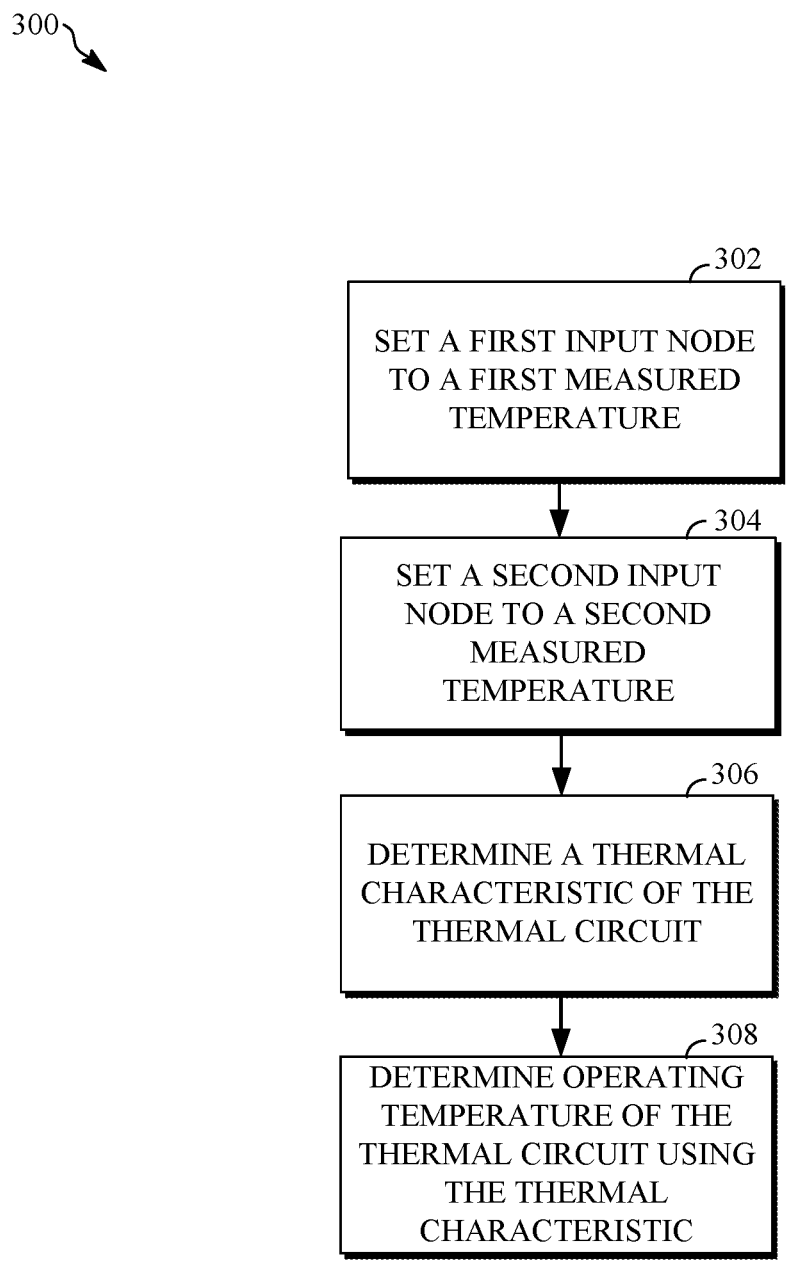
FIG. 3 is a flow diagram generally illustrating a thermal circuit modeling method according to the principles of the present disclosure.

FIG. 3 is a flow diagram generally illustrating a thermal circuit modeling method 300 according to the principles of the present disclosure. At 302, the method 300 sets a first input node to a first measured temperature. As described, the controller 110 may set a temperature associated with the first input temperature source 102 to a first measured temperature. At 304, the method 300 sets a second input node to a second measured temperature. As described, the controller 110 may set a temperature associated with the second input temperature source 104 to a second measured temperature. At 306, the method 300 determines a thermal characteristic of the thermal circuit. As described, the controller 110 determines at least one thermal characteristic of the thermal circuit 100. For example, the controller 110 calculates the state space equations (1)-(6) to determine temperature at each of the nodes of the thermal circuit 100. The controller 110 may then calculate equation (8) to determine power loss values associated with the first input temperature source 102. At 308, the method 300 determines an operating temperature of the thermal circuit using the thermal characteristic. As described, the controller 110 may predict or estimate an operating temperature at the thermal circuit 100 based on the calculated thermal characteristics of the thermal circuit 100.

Figure 4:
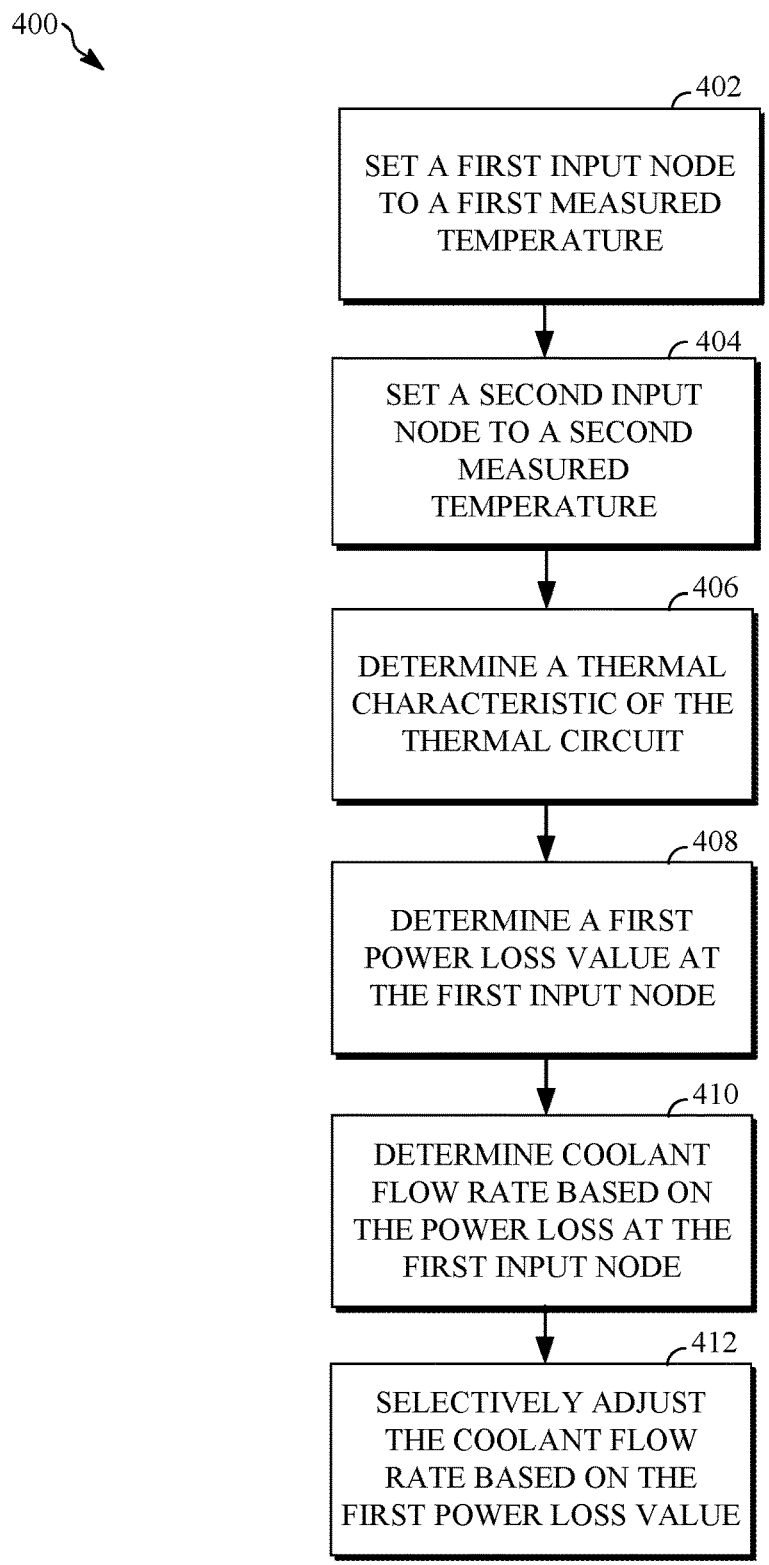
FIG. 4 is a flow diagram generally illustrating a coolant flow rate control method according to the principles of the present disclosure.

FIG. 4 is a flow diagram generally illustrated a coolant flow rate control method 400 according to the principles of the present disclosure. At 402, the method 400 sets a first input node to a first measured temperature. As described, the controller 110 may set a temperature associated with the first input temperature source 102 to a first measured temperature. At 404, the method 400 sets a second input node to a second measured temperature. As described, the controller 110 may set a temperature associated with the second input temperature source 104 to a second measured temperature. At 406, the method 400 determines a thermal characteristic of the thermal circuit. As described, the controller 110 determines at least one thermal characteristic of the thermal circuit 100. For example, the controller 110 calculates the state space equations (1)-(7) to determine temperature at each of the nodes of the thermal circuit 100.

At 408, the method 400 determines a first power loss value at the first input node. As described, the controller 110 calculates equation (8) to determine the power loss values associated with the first input temperature source 102 based on the thermal characteristic. At 410, the method 300 determines a coolant flow rate based on the first power loss value at the first input node. As described, the controller 110 may predict or estimate a coolant flow rate associated with the coolant of the liquid cooled heatsink using the first power loss value at the first input node of the thermal circuit 100. At 412, the method 400 selectively adjusts the coolant flow rate of the thermal circuit 100 based on the first power loss value. A described, the controller 110 uses one or more calculated power loss values associated with the first input temperature source 102 to adjust the coolant flow rate. For example, the controller 110 uses the sum of various power loss values associated with the first input temperature source 102 calculated across all six devices as an error input in a control loop 200 to modulate a change in flow rate. As described, if the sum of the various power loss values associated with the first input temperature source 102 calculated by the controller 110 is a positive value, the controller 110 decreases the flow rate which increases the temperature associated with the first input temperature source 102 in order to draw the power loss from the first input temperature source 102 to zero.

Conversely, if the sum of the various power loss values associated with the first input temperature source 102 calculated by the controller 110 is a negative, the controller 110 increases the flow rate, which decreases the temperature, associated with the first input temperature source 102 in order to draw the power loss from the first input temperature source 102 to zero.

In some embodiments, a method for modeling a thermal circuit of a power inverter includes setting a first input node of the thermal circuit to a first measured temperature. The method also includes setting a second input node of the thermal circuit to a second measured temperature. The method also includes determining at least one thermal characteristic of the thermal circuit using, at least, the first measured temperature and the second measured temperature. The method also includes determining an operating temperature of the thermal circuit based on the at least one thermal characteristic.

In some embodiments, the power inverter is configured to drive an electric propulsion motor of an associated vehicle. In some embodiments, the thermal circuit includes at least one power source. In some embodiments, at least one thermal characteristic includes a temperature at a node of the thermal circuit. In some embodiments, the method also includes determining a plurality of other thermal characteristics of the thermal circuit using, at least, the first measured temperature and the second measured temperature. In some embodiments, the method also includes determining a first power loss value associated with the first input node. In some embodiments, the method also includes determining a coolant flow rate using the first power loss value. In some embodiments, one of the first input node and the second input node includes an insulated-gate bipolar transistor temperature input node and the other of the first input node and the second input node includes a coolant temperature input node.

In some embodiments, a cooling thermal circuit modeling system includes a thermal circuit and a controller. The thermal circuit is associated with a power inverter having at least a first input node and a second input node. The controller is configured to: set the first input node of the thermal circuit to a first measured temperature; set the second input node of the thermal circuit to a second measured temperature; determine at least one thermal characteristic of the thermal circuit using, at least, the first measured temperature and the second measured temperature; and determine an operating temperature of the thermal circuit based on the at least one thermal characteristic.

In some embodiments, the power inverter is configured to drive an electric propulsion motor of an associated vehicle. In some embodiments, the analysis is applied to multiple layers of the thermal circuit that includes IGBT and diodes. In some embodiments, the at least one thermal characteristic includes a temperature at a node of the thermal circuit. In some embodiments, the controller is further configured to determine a plurality of other thermal characteristics of the thermal circuit using, at least, the first measured temperature and the second measured temperature. In some embodiments, the controller is further configured to determine a first power loss value associated with the first input node. In some embodiments, the controller is further configured to determine a coolant flow rate using the first power loss value. In some embodiments, one of the first input node and the second input node includes an insulated-gate bipolar transistor temperature input node and the other of the first input node and the second input node includes a coolant temperature input node.

In some embodiments, a method for controlling a coolant flow rate of a power inverter includes setting a first input node of a thermal circuit associated with the power inverter to a first measured temperature. The method also includes setting a second input node of the thermal circuit to a second measured temperature. The method also includes determining at least one thermal characteristic of the thermal circuit using, at least, the first measured temperature and the second measured temperature. The method also includes determining the coolant flow rate of the power inverter based on the at least one thermal characteristic. The method also includes determining a first power loss value at the first input node. The method also includes selectively adjusting the coolant flow rate of the modeled thermal circuit based on the first power loss value.

In some embodiments, the at least one thermal characteristic includes a temperature at a node of the thermal circuit. In some embodiments, the method also includes determining a plurality of other thermal characteristics of the thermal circuit using, at least, the first measured temperature and the second measured temperature. In some embodiments, one of the first input node and the second input node includes an insulated-gate bipolar transistor temperature input node and the other of the first input node and the second input node includes a coolant temperature input node.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

What is claimed is:

1. A method for modeling a thermal circuit of a power inverter, the method comprising:
   setting a first input node of the thermal circuit to a first measured temperature;
   setting a second input node of the thermal circuit to a second measured temperature;
   determining at least one thermal characteristic of the thermal circuit using, at least, the first measured temperature and the second measured temperature; and
   determining an operating temperature of the thermal circuit based on the at least one thermal characteristic,
   wherein one of the first input node and the second input node includes a power semiconductor device temperature input node and the other of the first input node and the second input node includes a coolant temperature input node.

2. The method of claim 1, wherein the power inverter is configured to drive an electric propulsion motor of an associated vehicle.

3. The method of claim 1, wherein the thermal circuit includes at least one power source.

4. The method of claim 1, wherein the at least one thermal characteristic includes a temperature at a node of the thermal circuit.

5. The method of claim 1, further comprising
   determining a plurality of other thermal characteristics of the thermal circuit using, at least, the first measured temperature and the second measured temperature.

6. The method of claim 1, further comprising
   determining a first power loss value associated with the first input node.

7. The method of claim 6, further comprising
   determining a coolant flow rate using the first power loss value.

8. A thermal circuit modeling system comprising:
   a thermal circuit associated with a power inverter having at least a first input node and a second input node; and
   a controller configured to:
     set the first input node of the thermal circuit to a first measured temperature;
     set the second input node of the thermal circuit to a second measured temperature;

determine at least one thermal characteristic of the thermal circuit using, at least, the first measured temperature and the second measured temperature; and determine an operating temperature of the thermal circuit based on the at least one thermal characteristic, wherein one of the first input node and the second input node includes a power semiconductor device temperature input node and the other of the first input node and the second input node includes a coolant temperature input node.

9. The system of claim 8, wherein the power inverter is configured to drive an electric propulsion motor of an associated vehicle.

10. The system of claim 8, wherein the thermal circuit includes at least one power source.

11. The system of claim 8, wherein the at least one thermal characteristic includes a temperature at a node of the thermal circuit.

12. The system of claim 8, wherein the controller is further configured to determine a plurality of other thermal characteristics of the thermal circuit using, at least, the first measured temperature and the second measured temperature.

13. The system of claim 8, wherein the controller is further configured to determine a first power loss value associated with the first input node.

14. The system of claim 13, wherein the controller is further configured to determine a coolant flow rate using the first power loss value.

15. A method for controlling a coolant flow rate of a modeled thermal circuit power inverter, the method comprising:

setting a first input node of a modeled thermal circuit associated with the power inverter to a first measured temperature;

setting a second input node of the modeled thermal circuit to a second measured temperature;

determining at least one thermal characteristic of the modeled thermal circuit using, at least, the first measured temperature and the second measured temperature;

determining the coolant flow rate of the power inverter based on the at least one thermal characteristic;

determining a first power loss value at the first input node; and selectively adjusting the coolant flow rate of the modeled thermal circuit based on the first power loss value, wherein one of the first input node and the second input node includes a power semiconductor device temperature input node and the other of the first input node and the second input node includes a coolant temperature input node.

16. The method of claim 15, wherein the at least one thermal characteristic includes a temperature at a node of the modeled thermal circuit.

17. The method of claim 15, further comprising determining a plurality of other thermal characteristics of the modeled thermal circuit using, at least, the first measured temperature and the second measured temperature.

* * * * *